United States Patent [19]
Kapron et al.

[11] 3,761,716
[45] Sept. 25, 1973

[54] OPTICAL WAVEGUIDE MODE DISCRIMINATOR

[76] Inventors: Felix P. Kapron, R.D. No. 1, Box 139, Elmira, N.Y. 14903; Donald B. Keck, Chequers Cir., Big Flats, N.Y. 14814

[22] Filed: Jan. 3, 1972

[21] Appl. No.: 214,896

[52] U.S. Cl. ............... 250/199, 329/144, 307/311, 350/169
[51] Int. Cl. ............................................. H04b 9/00
[58] Field of Search ............. 250/199; 307/311, 307/312; 331/94.5 A, 94.5 C; 350/96 WG, 96 B, 150, 151, 169, 173; 329/144

Primary Examiner—Robert L. Griffin
Assistant Examiner—William T. Ellis
Attorney—Clarence R. Patty, Jr. et al.

[57] ABSTRACT

Light radiating from a multimode optical waveguide is coupled to the input ends of a plurality of optical waveguide mode discriminators, each of which has a light detector for receiving light radiating from the output thereof. The first mode discriminator propagates only the lowest order mode propagated by the multimode waveguide, the second mode discriminator propagates only the lowest and second lowest order modes, and so on. The amplitudes and phases of the lowest order mode signals provided by the detectors associated with the first and second mode discriminators are equalized and these two equalized signals are coupled to a substracter circuit which cancels the lowest order mode signals and provides a signal representative of the information propagated by the second lowest order mode. In a similar manner the information propagated by higher order modes can be obtained.

8 Claims, 3 Drawing Figures

OPTICAL WAVEGUIDE MODE DISCRIMINATOR

BACKGROUND OF THE INVENTION

The continually increasing amount of traffic that communication systems are required to handle has forced the development of high capacity systems. Even with the increased capacity made available by systems operating between $10^9$ Hz and $10^{12}$ Hz, traffic growth is so rapid that saturation of such systems is anticipated in the very near future. Higher capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at frequencies around $10^{15}$ Hz.

The transmitting media required in the transmission of frequencies around $10^{15}$ Hz are hereinafter referred to as "optical waveguides." In conventional optical fibers the ratio of the total diameter to the core diameter is almost unity, and the difference between refractive indices of the core and cladding material is made as large as possible. The total diameter to core diameter ratio of optical waveguide fibers is usually between about 10:1 and 300:1 for single-mode waveguides and is usually between about 1001:1000 and 10:1 for multimode waveguides and the difference in the indices of refraction is maintained small.

A very thorough and complete discussion concerning the operational theories of optical waveguides is contained in U.S. Pat. No. 3,157,726 issued to Hicks et al. and in the publication "Cylindrical Dielectric Waveguide Mode" by E. Snitzer, *Journal of the Optical Society of America*, Vol. 51, No. 5, pages 491–498, May, 1961. Another excellent source of information concerning optical waveguides is *Fiber Optics — Principles and Applications* by N. S. Kapany, Academic Press, 1967.

Explanations of the physics of electrical and magnetic microwave transmission are often based on the concept that such waves are made up of a finite number of modes. Each of these modes has its own propagation and distribution characteristics. The propagation of light waves is governed by laws of physics similar to those that govern microwave propagation and therefore can also be studied in terms of modes. The conditions under which propagation of a particular mode will no longer be localized within and around the core of an optical fiber can be expressed in terms of a cutoff value U. An exceptionally complex equation, and an explanation thereof, from which the value U for a particular mode can be determined may be found on page 55 of the aforementioned book by N.S. Kapany. Kapany also expresses a fiber characteristic term R, now commonly referred to as $V$, in terms of the optical fiber variables by the equation $$V = 2\pi a/\lambda \ \sqrt{n_1^2 - n_2^2}$$

(1)

where
$a$ = core radius of the waveguide
$\lambda$ = wavelength of light to be transmitted
$n_1$ = core index of refraction
$n_2$ = cladding index of refraction which can be rewritten as $$V = 2\pi a/\lambda \ \sqrt{(n_1 + n_2)(n_1 - n_2)}$$

(2)

Then, as is explained in Kapany, for a particular mode to propagate within an optical fiber having a particular fiber characteristic term $V$, $V$ must be greater than or equal to the cutoff value U for said mode.

For example, the $HE_{11}$ mode is the only mode of light that will propagate along a fiber which has a V value of less than 2.405. Therefore, if V is set equal to 2.405, and equation (2) is evaluated it can be seen that a method of limiting light propagation of a desired wavelength to one mode is to coordinate the waveguide parameters $a$, $n_1$, and $n_2$. That is, if the difference between the two indices of refraction $(n_1 - n_2)$ increases the core radius $a$ must decrease and if $(n_1 - n_2)$ decreases the core radius $a$ must increase. Multimode light waveguide fibers having a V value greater than 2.405 are capable of propagating one or more modes of higher order than the $HE_{11}$ mode, the total number of modes depending upon the V value thereof.

The aforementioned Hicks et al. patent teaches that the optical and physical properties of an optical fiber can be suitably controlled in accordance with the wavelength of the light to be transmitted thereby to cause the fiber to function as a highly efficient optical waveguide and simultaneously transmit one or a number of distinct and separately predetermined modes of energy propagation while rejecting others, with the result that separate modes can be, in effect, utilized as channels for the independent but simultaneous transmission of different information or signals therethrough. It is further stated in that patent that the propagation mode or modes afforded by a very small or ultra small filament depends upon the condition or combination of conditions being used to illuminate the same, and that if all other related factors remain unchanged, different mode propagations through the single fiber may be produced by changing the illumination conditions. Such techniques as changing the frequency or polarization of illumination and directing a cone of light at the end of the waveguide fiber are disclosed. Light distribution patterns of different electromagnetic modes of energy propagation are illustrated in this patent in FIGS. 2 through 7 and 9 through 27. Photographs of mode patterns appearing at the output ends of waveguides also appear on pages 60 and 61 of the aforementioned book by N. S. Kapany. A spacial-filtering technique for launching an arbitrary mode on an optical waveguide is taught in the publication "Fiber Optics.XII. A Technique for Launching an Arbitrary Mode on an Optical Dielectric Waveguide" by N.S. Kapany et al., *Journal of the Optical Society of America*, Vol. 60, No. 9, pages 1,178–1,185, September, 1970. FIG. 4 of this latter mentioned publication is a photograph of the experimental apparatus used to photograph the image of the output end of an optical waveguide, and FIGS. 5, 6 and 7 are photographs of mode patterns produced by the propagation of different single modes in the optical waveguide. Other mode patterns and methods of obtaining the same can be found in the publication "Observed Dielectric Waveguide Modes in the Visible Spectrum" by E. Snitzer et al., *Journal of the Optical*

Society of America, Vol. 51, No. 5, pages 499–505, May, 1961.

SUMMARY OF THE INVENTION

The present invention relates to an optical waveguide mode discriminator for providing a plurality of electrical signals, each corresponding to information propagated by one of a plurality of optical modes transmitted by a single multi-mode optical waveguide.

Briefly, the mode discriminator system of the present invention comprises a plurality of optical waveguide mode discriminators, the first of which has a V value such that only the lowest order mode propagated by the multimode waveguide will propagate therein, the second of which has a V value such that only the lowest and second lowest order modes propagated by the multimode waveguide would propagate therein, and each succeeding mode discriminator has a V value higher than that of the previous mode discriminator so that it is capable of propagating one more of the modes propagated by the multimode waveguide than the immediately preceding mode discriminator. Means are provided for directing a portion of the light radiated from the multimode waveguide onto an end of each of the mode discriminators. A plurality of light detectors is provided, one of which is disposed in light receiving relationship with respect to a corresponding one of the plurality of mode discriminators. The first detector receives light radiating from the first mode discriminator, the second detector receives light from the second mode discriminator, and each successive detector receives light from the next successive mode discriminator. Means are provided for combining in a subtracting relationship the first and second detector output signals to provide an electrical signal corresponding to the information carried by the second lowest order mode propagated by the multimode waveguide.

DESCRIPTION OF THE PREFERRED EMBODIMENT

Figure 1:
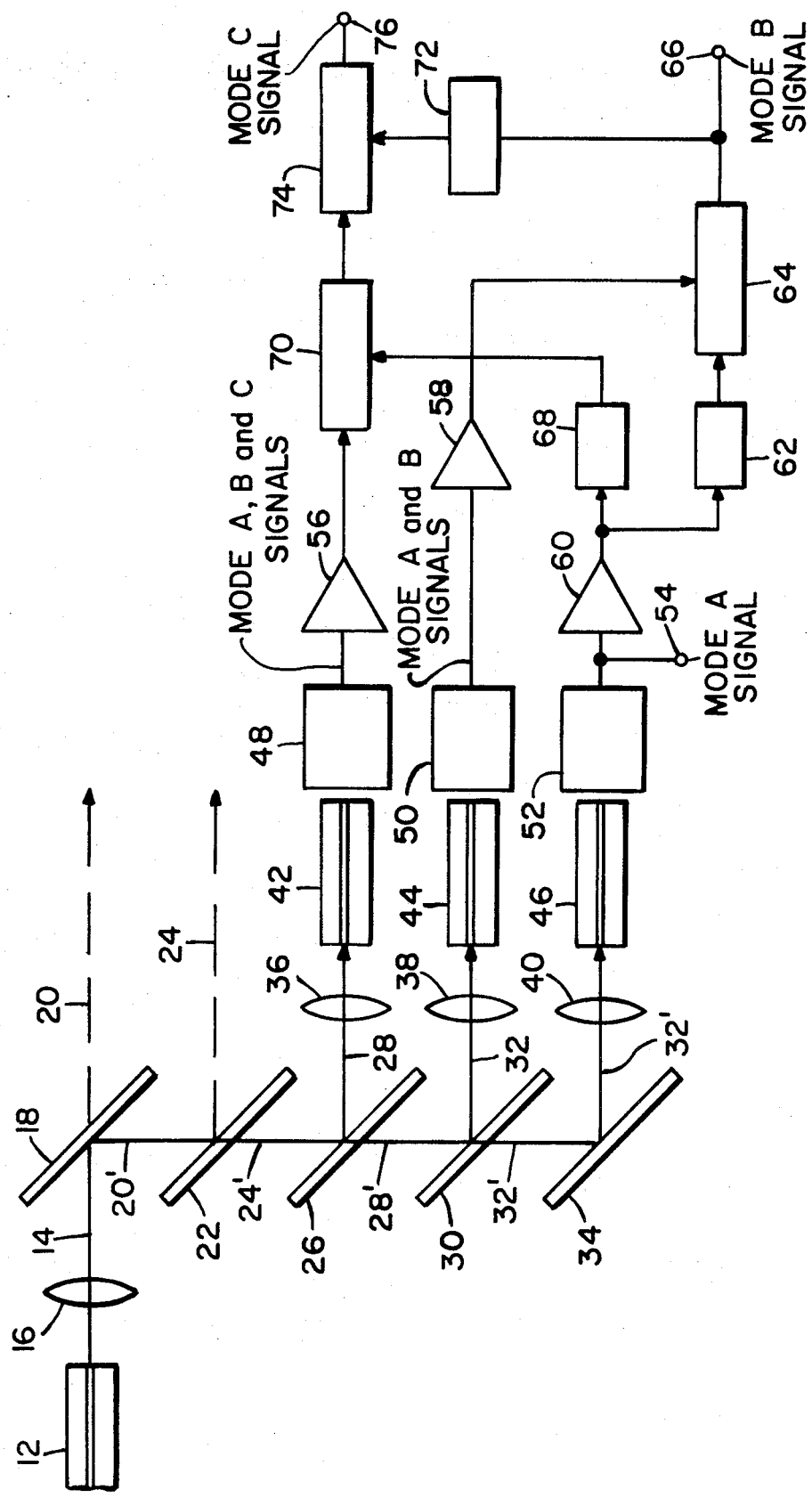
FIG. 1 is a schematic representation of the mode discriminator system of the present invention.

In the preferred embodiment illustrated in FIG. 1, optical waveguide 12, may be of the general type described in the aforementioned Hicks et al. patent and is preferably of the type described in U.S. Patent application Ser. No. 36,267 now U.S. Pat. No. 3,711,267 "Method of Producing Optical Waveguide Fibers" filed May 11, 1970 which describes an optical waveguide fiber capable of transmitting optical signals over relatively long distances. As mentioned hereinabove, waveguide 12 is capable of propagating a finite number of waveguide modes, depending upon the V value thereof, which in turn depends upon the physical parameters thereof as well as the wavelength of light being transmitted thereby. A different signal may be transmitted by each of these modes. Light emanating from waveguide 12, which is illustrated by line 14, is directed by lens 16 onto beam splitter 18 which passes a small portion thereof indicated by broken line 20 and reflects the remainder thereof as illustrated by line 20'.

Light beam 20' impinges upon beam splitter 22 which reflects a portion which is illustrated by broken line 24, the remainder thereof passing through beam splitter 22 as indicated by line 24'. In a similar manner, beam splitters 26 and 30 reflect a portion of the light incident thereon as indicated by lines 28 and 32, respectively, and permit light indicated by lines 28' and 32' to pass therethrough. A mirror 34 may be used to totally reflect light beam 32'.

Light beams 28, 32 and 32' are focused by lenses 36, 38 and 40 upon the cores of mode discriminator optical waveguides 42, 44 and 46, respectively. Broken lines 20 and 24 illustrate the fact that additional mode discriminator optical waveguides similar to waveguides 42, 44 and 46 could be utilized in a system for discriminating between four or more transmitted modes, whereas the apparatus illustrated in FIG. 1 is capable of discriminating between three different modes transmitted by waveguide 12. Light detectors 48, 50 and 52 may be disposed immediately adjacent to the output ends of waveguides 42, 44 and 46, respectively, or light from the waveguides may be directed to the detectors by lenses, not shown, so that they detect all of the light emanating from their respective waveguide.

For purposes of illustration, it is assumed that the V value of waveguide 12 is between about 4.1 and 5.0 so that it is capable of transmitting the seven lowest order modes. It is further assumed that only the $HE_{11}$, $TM_{01}$ and $HE_{12}$ modes have been propagated through waveguide 12. The $HE_{11}$, $TM_{01}$ and $HE_{12}$ modes are hereinafter referred to as modes A, B, and C to emphasize the fact that any three distinguishable modes may be separated by the system shown in FIG. 1.

The V value of optical waveguide 46 is such that it propagates only the lowest order mode propagated by waveguide 12. In the specific embodiment described, waveguide 46 has a V value of less than about 2.4 and therefore propagates only mode A, the $HE_{11}$ mode. Light detector 52 therefore detects only that mode and provides an electrical output signal corresponding to the modulation imposed on the $HE_{11}$ mode light from waveguide 12. Output terminal 54 is labeled "mode A signal" to indicate that the electrical signal corresponding to the lowest mode appears at that terminal.

Waveguide 44 has a V value between about 2.6 and 3.7, so that, of the three modes propagated by waveguide 12, it will transmit only modes A and B, the $HE_{11}$ and $TM_{01}$ modes. The V value of waveguide 42 is greater than about 4.1 and that waveguide therefore is capable of propagating all three of the modes transmitted by waveguide 12. It is preferred that the V value of waveguide 42 be just high enough to propagate the highest order mode to be detected. In a system wherein more than three modes are transmitted, one or more waveguides similar to waveguides 42, 44 and 46 can be disposed in light receiving relationship with respect to light beams such as beams 20 and 24. In such a situation, waveguide 42 must have a V value such that it would be incapable of transmitting the next higher mode above mode C, the $HE_{12}$ mode in the present example.

A light waveguide having a V value less than that required to support a given mode will radiatively lose that mode if it is initially propagated in the waveguide. In order to radiatively lose a particular mode, the waveguide must have a minimum length which may be experimentally determined by exciting the undesired mode in a length of waveguide from which the undesired mode is completely radiated and shortening the waveguide until the undesired mode just begins to appear at the output end thereof. A waveguide having a length slightly longer than that obtained by this process will be the minimum length of waveguide necessary to completely eliminate the undesired mode. It is preferred that this minimum length of waveguide be used to eliminate undesired modes since the time delay differences between the transmitted modes increase with waveguide length.

An electrical signal containing information transmitted by both modes A and B appears at the output of detector 50. An electrical signal containing only information corresponding to that contained in mode B can be obtained by subtracting the electrical output of detector 52 from that of detector 50. To accurately perform such a subtraction, the amplitude and phase of the mode A signal provided by detector 52 must be equal to that of the mode A signal provided by detector 50. The amplitudes of the mode A signals provided by these two detectors can be equalized by controlling the proportion of light transmitted and light reflected by beam splitter 30 or by adjusting the gain of amplifiers 58 and 60, which are connected to detectors 50 and 52, respectively. The required transmittance-reflectance ratio of beam splitter 30 and/or the required gains of amplifiers 58 and 60 can be theoretically determined by calculating the input efficiencies and transmission efficiencies of waveguides 44 and 46, or they can be experimentally determined by transmitting only mode A through waveguide 12 and measuring the amplitudes of the signals appearing at the outputs of detectors 50 and 52.

As stated hereinabove, the mode A signals provided by detectors 50 and 52 must be in phase in order to cancel these signals by subtraction and obtain the mode B signal. The transit time for a given mode to propagate through a section of waveguides depends upon the effective refractive index of the waveguide for that particular mode, and may be determined as follows. An information transmitting signal consists of carrier modulated pulses, the group velocity $V_g$ of the modulated carrier being given by the equation $$V_g = c/n_g = 1/dh/d\omega \qquad (3)$$

where $n_g$ is the group index, $c$ is the speed of light in vacuum, $h$ is the wave number or propagation constant and $\omega$ is the circular frequency. The wave number $h$ is contained in the following equation which is adapted from the aforementioned Snitzer publication and the aforementioned Kapany book.

$$\xi - \tfrac{1}{2}(k^2+1)\eta - n(1/u^2 + k^2+1/2w^2) =$$
$$\pm [(k^2-1)^2(\eta^2/4 + n\eta/2w^2) + n^2(1/u^2 + k^2+1/2w^2)^2]^{1/2} \qquad (4)$$

with the notational change $\xi = J_{n-1}(u)/uJ_n(u)$ $\eta = K_{n-1}(w)/wK_n(w)$ and $k = n_2/n_1$.

The (+) sign holds for $EH_{nm}$ ($n \neq 0$) and $TE_{om}$ ($n=0$) while the (−) sign is for $HE_{nm}$ and $TE_{om}$. The order of the root is $m$, the number of antinodes in $J_n(u)$. The derivative in equation (3) is calculable from the solutions for $h$ obtained from equation (4).

Over a length L of optical waveguide, the group delay for a particular mode is given by the equation $$t = L/V_g = L\, dh/d\omega \qquad (5)$$

The variation of this quantity from mode to mode, due to the variation of the wave number $h$ from mode to mode, necessitates the use of delay lines in the system of FIG. 1.

The time required for lowest order mode A to propagate through waveguide 46 will be less than the time required for mode A to propagate through waveguide 44, assuming that the lengths and the core and cladding indices of refraction of the both guides are the same. These times required for mode A to propagate through waveguides 44 and 46 can be determined from equation (5). If the length of waveguide 46 were a sufficient amount greater than that of waveguide 44 or if the core and cladding indices of refraction of waveguide 46 were sufficiently higher than those of waveguide 44, the time required for mode A to propagate through waveguide 44 would be greater than that required for its propagation through waveguide 46. Proper selection of the parameters of waveguides 44 and 46 would result in identical propagation times for mode A in both waveguides. If these propagation times differ, the phases as well as the amplitudes of the mode A signals derived from detectors 50 and 52 must be equalized so that the mode A signals can be cancelled, leaving only the mode B signal which is derived from detector 50.

In the preferred embodiment the signal derived from detector 52 is subtracted from that derived from detector 50 after the phases and amplitudes of the mode A signals from these detectors are equalized. The phases of these signals can be equalized by inserting a delay line in the appropriate circuit path. As suggested hereinabove, the time required for mode A to propagate through waveguide 46 may be longer than that required for its propagation through waveguide 44. In such a case a delay line would be inserted in the circuit path after detector 50 to equalize the phases of the mode A signals derived from detectors 50 and 52. Assuming the more probable situation, wherein waveguide 44 has the greater propagation time for mode A, delay line 64 is connected in the circuit path after detector 52. The amount of delay provided by delay line 62 is the difference in propagation times for mode A through waveguides 44 and 46 determined as outlined hereinabove.

Figure 2:
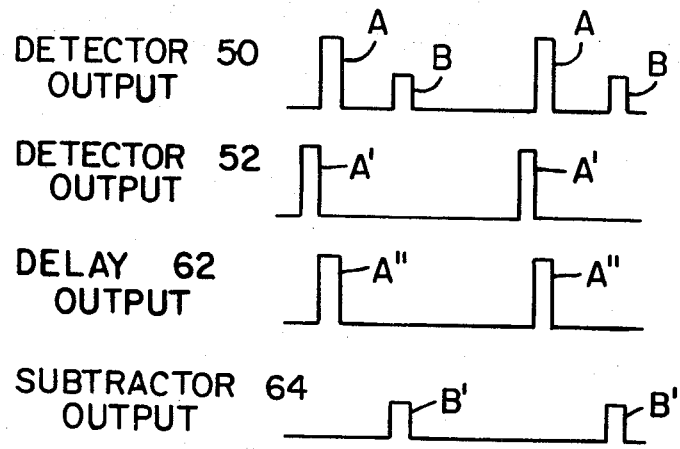
FIG. 2 is a diagram illustrating the waveforms appearing at various parts of the circuit of FIG. 1.

The signal waveforms appearing at the outputs of detectors 50 and 52 are illustrated in FIG. 2. The output from detector 50 consists of pulses A and B which are indicative of information carried by modes A and B, respectively. Whereas these pulses are illustrated as being amplitude modulated pulses, any type of modulation could be employed. The output from detector 52 consists of only pulses A' the phase of which is slightly advanced with respect to that of pulses A from detector 50. The output from delay line 62 consists of pulses A'' which are in phase with pulses A. When the output from delay line 62 is subtracted from that from detector 50 in subtractor circuit 64, the output from the subtracter circuit is the mode B signal illustrated in FIG. 2 by the pulses B'.

Since the equations for pulse transit time must be solved by computer, it may be preferable to utilize variable delay lines, the delay of which can be adjusted until the proper delay is achieved. For example, a mode A signal could be coupled into waveguides 44 and 46.

Since the two mode A signals are out of phase at subtracter circuit 64, a signal will appear at the output thereof. Delay line 62 can be adjusted until no signal appears at the output thereof. Delay line 62 can be adjusted until no signal appears at the output of subtracter circuit 64, thereby indicating that the mode A signals supplied thereto are in phase. All delay lines in the system of FIG. 1 could be similarly adjusted.

In a manner similar to that described above, the mode C signal is obtained by subtracting the mode A signal and mode B signal from the output of detector 48 which contains information corresponding to that propagated by modes A, B, and C in waveguide 29. However, since the mode A and mode B signals take longer to propagate through waveguide 42 than through waveguides 44 and 46, respectively, the mode A signal must be delayed by a delay line 68 and the mode B signal must be delayed by a delay line 72 before the signals can be subtracted from the output from detector 48. Each mode signal must be separately delayed since each mode travels through a particular waveguide at its own characteristic velocity. Thus, in a manner similar to that described in conjunction with the derivation of the mode B signal, the delayed mode A signal at the output of delay line 68 is subtracted from the output from detector 48 in a subtracter circuit 70 and the delayed mode B signal at the output of delay line 72 is subtracted from the output from subtracter 70 in a subtracter circuit 74 to provide the mode C signal at terminal 76. Whereas two subtracter circuits 70 and 74 are illustrated in FIG. 1, a single subtracter circuit, which is capable of subtracting the mode A and mode B signals from the detector 48 output, could be utilized. Alternatively, the mode A and mode B signals at the outputs of delay lines 68 and 72, respectively, could be combined prior to being coupled to a single subtracter circuit. Any suitable means could be employed to perform this subtraction function.

In order to separate still higher order modes from a plurality of modes propagated by waveguide 12, the appropriately delayed mode A, B and C signals can be subtracted from the combined signal derived from a detector associated with a waveguide capable of propagating modes A, B, C and the higher order mode. As stated previously, amplifiers 56, 58 and 60 would not be necessary if the beam splitters 26 and 30 had the proper reflection and transmission characteristics. Moreover, an amplifier may be necessary in some other part of the circuit where it is necessary to equalize the amplitudes of two signals which are to be cancelled by a subtracter circuit. For example, if the mode B signal appearing at terminal 66 were too weak to cancel the mode B portion of the signal at the output of subtracter 70, an amplifier could be interposed between delay 72 and subtracter 74. Rather than amplifying to equalize signals to be cancelled, an attenuator could be used to attenuate the stronger of the two signals before such signals are supplied to a subtracter circuit. Thus, amplifiers 56, 58 and 60 could each be replaced by an appropriate attenuator. However, amplifiers may be preferred in order to strengthen the signals prior to further processing.

Figure 3:
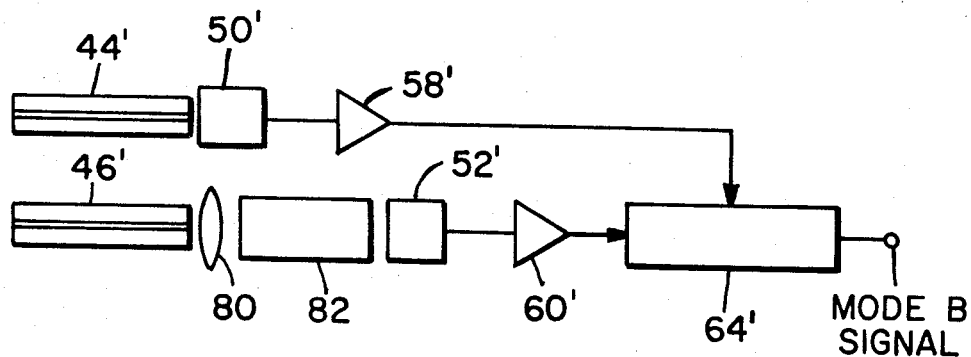
FIG. 3 is a schematic representation of a modification of the circuit of FIG. 1.

FIG. 3 shows an alternative circuit for equalizing the phases of the mode A signals prior to cancellation of the same in a subtraction circuit. Elements in this figure, which are similar to elements in FIG. 1, are identified by primed reference numerals. Light radiating from waveguide 46' is directed by lens 80 through optical delay means 82 to detector 52'. Delay means 82 could be a block of fused silica having a predetermined optical path length so that the desired delay is achieved.

We claim:

1. In an optical communication system of the type wherein a plurality of dielectric waveguide modes are propagated in a single multimode optical waveguide, each mode carrying information corresponding to a separate modulation signal, a mode discriminator system comprising a plurality of optical waveguide mode discriminators, the first of which has a V value such that only the lowest order mode propagated by said multimode waveguide will propagate therein, the second of which has a V value such that only the lowest and second lowest order modes propagated by said multimode waveguide will propagate therein, and each succeeding mode discriminator has a V value higher than that of the previous mode discriminator so that it is capable of propagating one more of the modes propagated by said multimode waveguide than the immediately preceding mode discriminator, means for directing a portion of the light radiating from said multimode waveguide onto an end of each of said mode discriminators, a plurality of light detectors, one of which is disposed in light receiving relationship with respect to a corresponding one of said plurality of mode discriminators, the first detector receiving light radiating from said first mode discriminator, the second detector receiving light from said second mode discriminator, and each successive detector receiving light from the next successive mode discriminator, and means for combining in a subtracting relationship the first and second detector output signals to provide an electrical signal corresponding to the information carried by the second lowest order mode propagated by said multimode waveguide.

2. A system in accordance with claim 1 further comprising means for equalizing the amplitude and phase of the lowest order mode information contained in the electrical signals at the outputs of said first and second detectors.

3. A system in accordance with claim 2 wherein said means for equalizing comprises a delay line connected to the output of said first detector, the output of said delay line being connected to said means for combining.

4. A system in accordance with claim 3 wherein said means for equalizing further comprises means for amplifying the output from each of said light detectors.

5. A system in accordance with claim 2 wherein said means for equalizing comprises an optical delay line disposed between said first mode discriminator and said first light detector, and means for directing light emanating from said first mode discriminator onto said optical delay line.

6. A system in accordance with claim 1 wherein said means for directing comprises means for reflecting at least a portion of the light radiating from said multimode waveguide onto each mode discriminator.

7. In an optical communication system of the type wherein a plurality of dielectric waveguide modes are propagated in a single multimode optical waveguide, each mode carrying information corresponding to a separate modulation signal, a mode discriminator system comprising a plurality of optical waveguide mode discriminators, the first of which has a V value such that only the lowest order mode propagated by said multimode waveguide will propagate therein, the second of which has a V value such that only the lowest and second lowest order modes propagated by said multimode waveguide will propagate therein, and each succeeding mode discriminator has a V value higher than that of the previous mode discriminator so that it is capable of propagating one more of the modes propagated by said multimode waveguide than the immediately preceding mode discriminator, means for directing a portion of the light radiating from said multimode waveguide onto an end of each of said mode discriminators, a plurality of light detectors, one of which is disposed in light receiving relationship with respect to a corresponding one of said plurality of mode discriminators, the first detector receiving light radiating from said first mode discriminator, the second detector receiving light from said second mode discriminator, and each successive detector receiving light from the next successive mode discriminator, first delay means connected to the output of said first detector, and first subtracter means for subtracting the output of said first delay means from the output from said second detector to provide an electrical signal corresponding to the information carried by the second lowest order mode propagated by said multimode waveguide.

8. A system in accordance with claim 7 further comprising second delay means connected to the output of said first detector, third delay means connected to the output of said first subtracter means, and second subtracter means for subtracting the outputs of said second and third delay means from the output of the third of said plurality of light detectors to provide an electrical signal corresponding to the information carried by the third lowest order mode propagated by said multimode waveguide.

* * * * *